United States Patent [19]

Massey et al.

[11] 4,374,949

[45] Feb. 22, 1983

[54] COMPOSITION AND PROCESS FOR MAKING A GREEN COLORED POLYESTER

[75] Inventors: Fred L. Massey, Uniontown; Douglas D. Callander, Akron, both of Ohio

[73] Assignee: The Goodyear Tire & Rubber Company, Akron, Ohio

[21] Appl. No.: 198,071

[22] Filed: Oct. 27, 1980

[51] Int. Cl.³ .............................................. C08L 67/02
[52] U.S. Cl. .................................. 524/720; 524/785; 524/878
[58] Field of Search ............. 260/40 R; 524/720, 783, 524/785, 88, 431

[56] References Cited

U.S. PATENT DOCUMENTS

| | | | |
|---|---|---|---|
| 3,345,187 | 10/1967 | Binnis | 260/40 R |
| 4,094,853 | 6/1978 | Monte et al. | 260/40 R |
| 4,206,100 | 6/1980 | Kyo et al. | 260/40 R |
| 4,250,078 | 2/1981 | McFarlane et al. | 260/40 R |

*Primary Examiner*—John C. Bleutge
*Assistant Examiner*—Robert E. L. Sellers
*Attorney, Agent, or Firm*—Bruce Hendricks; D. J. Hudak

[57] ABSTRACT

Specific color imparting compounds, including pigments and catalysts are used to produce a polyester resin having a green color. The compounds are added during polymerization of the polymer and the resins produced can be utilized to make various containers or packages to hold liquids or solids.

30 Claims, No Drawings

COMPOSITION AND PROCESS FOR MAKING A GREEN COLORED POLYESTER

TECHNICAL FIELD

The present invention relates to a green colored polyester made using specific color-imparting compounds.

Heretofore, various desired colors have been imparted to items, for example, glass, paint, paper, etc., through the use of various minerals, pigments, inks, and the like. However, to impart a color, for example, green, to a polyester which can be made into a container, e.g., a bottle, for containing liquids or solids as for human consumption, requires that specific safe color-imparting compounds be used. Furthermore, the pigments or catalysts must not adversely affect the properties of the polymer.

DISCLOSURE OF INVENTION

It is therefore an object of the present invention to provide a polyester resin having a green color.

It is yet another object of the present invention to provide a green colored polyester resin wherein the color can be imparted to any known polyester and wherein any known or conventional process for making the polyester is utilized.

It is yet another object of the present invention to provide a green colored polyester resin, as above, wherein said resin is made according to a melt state polymerization, or in combination with a subsequent solid state polymerization.

It is yet another object of the present invention to provide a green colored polyester resin, as above, wherein said polyester has a slight yellowish tinge.

IT is yet another object of the present invention to provide a green colored polyester resin, as above, wherein the color imparting compounds are added during the esterification and/or the polycondensation stage of the polymerization.

It is yet another object of the present invention to provide a green colored polyester resin as above, wherein a preformed alpha-ferric oxide or an iron compound is utilized as a catalyst that is converted to an alpha-$Fe_2O_3$ pigment during polymerization.

It is yet another object of the present invention to provide a green colored polyester resin, as above, wherein said iron compound is formed in situ by thermal decomposition of an iron salt.

It is yet another object of the present invention to provide a green colored polyester resin, as above, in which a titanium catalyst is utilized.

It is yet another object of the present invention to provide a green colored polyester resin, as above, in which a phthalocyanine blue pigment is also utilized.

It is yet another object of the present invention to provide a green colored polyester resin, as above, wherein said resin is polyethyleneterephthalate (PET) prepared by conventional methods from dimethylterephthalate or terephthalic acid with ethylene glycol.

It is yet another object of the present invention to provide a green colored polyester resin, as above, wherein said resin can be utilized to replace glass in the making of bottles and other containers.

It is yet another object of the present invention to provide a green colored polyester resin, as above, wherein said resin is suitable for beverage bottles.

These and other objects of the present invention will become apparent from the following description of the invention.

In general, in a polyester article, the improvement comprises: a small amount of various color-imparting compounds contained in the polyester for imparting a green color thereto; said compounds comprising an iron compound, a titanium catalyst, and a blue pigment, said iron compound being a preformed alpha-ferric oxide or an iron salt which is thermally decomposed during polymerization of said polyester to an alpha-ferric oxide; the proportion of said compounds being sufficient to effect a green color.

In general, a green colored polyester resin comprises: color-imparting compounds dispersed in the polyester resin, said compounds being an iron compound, a titanium catalyst, and a blue pigment, said iron compound being a preformed alpha-ferric oxide or an iron salt which is thermally decomposed during polymerization of said resin to alpha-ferric oxide, the amount of said pigments being such so that a green color is imparted to said polyester resin.

In general, a process for making a polyester resin having a green color, comprises the steps of: preparing a polyester resin; adding an iron compound to said polyester resin during preparation thereof; adding a titanium catalyst to said polyester resin during preparation thereof; adding a blue pigment to said polyester resin during preparation thereof; and imparting a green color to said resin by utilizing sufficient amounts of said iron compound, said titanium catalyst, and said blue pigment.

BEST MODE FOR CARRYING OUT THE INVENTION

According to the concepts of the present invention, a green colored polyester resin suitable for the production of containers, packages, etc., and especially for carbonated beverages, is produced. The polyesters to which a green color can be imparted are conventional or known polyesters made according to conventional or known methods, processes and the like. Generally, such polyesters include polymers formed from dicarboxylic acids containing a total of from 2 to 16 carbon atoms reacted with polyhydric alcohols such as glycols or diols containing from 2 to 12 carbon atoms. The alkyl dicarboxylic acids may contain a total of from 2 to 16 carbon atoms. Preferably, the acids are aryl or an alkyl substituted aryl acid containing from 8 to 16 carbon atoms. Specific examples of linear or alkyl dicarboxylic acids include oxalic acid, malonic acid, succinic acid, glutaric acid, adipic acid, pimelic acid, suberic acid, azelaic acid, sebacic acid, and the like. Specific examples of an aryl acid include the various isomers of phthalic acid, such as paraphthalic acid (terephthalic acid) and naphthalic acid. Specific examples of alkyl substituted aryl acids include the various isomers of dimethylphthalic acid such as dimethylisophthalic acid, dimethylorthophthalic acid, dimethylterephthalic acid, the various isomers of diethylphthalic acid such as diethylisophthalic acid, diethylorthophthalic acid, diethylterephthalic acid, the various isomers of dimethylnaphthalic acid such as 2,6-dimethylnaphthalic acid and 2,5-dimethylnaphthalic acid, and the various isomers of diethylnaphthalic acid. Generally, terephthalic acid is highly preferred.

It it well known to those skilled in the art, in lieu of the various dicarboxylic acids, the various diesters thereof may be utilized. Thus, alkyl diesters containing a total of from 2 to about 20 carbon atoms as well as alkyl substituted aryl diesters containing from about 10 to about 20 carbon atoms may be utilized. Examples of diesters include the diesters of oxalic acid, malonic acid, succinic acid, glutaric acid, adipic acid, pimelic acid, suberic acid, azelaic acid, or sebacic acid, and the like. Specific examples of various alkyl substituted aryl diesters include the various isomers of dimethylphthalate such as dimethylterephthalate, a preferred compound, the various isomers of diethylphthalate, the various isomers of dimethylnaphthalate, and the various isomers of diethylnaphthalate.

The diols or glycols may be straight chain or branched. Specific examples include ethylene glycol, propylene glycol, trimethylene glycol, 1,2-butane diol, 1,3-butane diol, 1,4-butane diol, 2,3-butane diol, neopentyl glycol, and the like. Of the various glycols, those having from 2 to 8 carbon atoms are preferred with ethylene glycol and 1,4-butane diol being highly preferred. In lieu of the various glycols, another glass of polyhydric alcohols, such as the glycol ethers containing from 4 to 12 carbon atoms, can be utilized as for example dimethylene glycol and 1,4-dihydroxyethoxy benzene.

The polyesters can be made according to melt polymerization, or melt and solid state polymerization. As known to those skilled in the art, polyesters are generally made in two stages. In the first stage or esterification stage, the diacid is reacted with the diol at elevated temperatures and pressures with water being produced. In the second stage or the polycondensation stage, a vacuum is gradually applied, generally catalysts are utilized, and water and a diol are withdrawn as a condensation product. Various polyesters can be made by such a polymerization including polyethyleneterephthalate, a preferred polyester resin. Moreover, the process may be modified slightly by reacting the dicarboxylic acid with the diol in a solvent which is a low molecular weight linear polyester in a manner as set forth in U.S. Pat. No. 4,020,049 to Rinehart, which is hereby fully incorporated with regard to the method of making the polyester resin. Another well known variation utilizes dimethylterephthalate which is reacted with ethylene glycol in the presence of a catalyst with a transesterification reaction yielding a bishydroxyethylterephthalate compound. A stabilizer may then be added as well as a catalyst and a polycondensation reaction is carried out to yield a polyester. Regardless of the exact process, such reactions can be carried out in situ.

Solid state polymerization can also be utilized. In this process, the polycondensation product is carried out until generally the intrinsic viscosity of the polymer melt reaches about 0.20 or higher, for example, up to about 0.80. At this point, the solution melt is cooled to produce a solid which is then pelletized, chopped, etc. The pellets are then subjected to a solid state polymerization wherein the vacuum is applied or a stream of inert gas passed at a temperature below the melting point of the partially formed polymer. Thus, the polymer is actually polymerized in a solid state, with the polycondensation reaction being continued in such a state. Generally, the solid state polymerization is continued until the intrinsic viscosity reaches any desirable level, such as from about 0.60 to about 1.0, or even higher. Desirably, the intrinsic viscosity ranges from about 0.70 to about 0.85 and preferably from about 0.70 to about 0.80. By intrinsic viscosity it is meant that the value obtained when $n_{specific}/C$ or LOG $n_{rel}/C$ is extrapolated to zero concentration; where the relative viscosity is defined as the quotient of the solution viscosity, $n_{soln.}$ and the viscosity of the solvent $n_{solv.}$, i.e., $n_{rel.} = n_{soln.}$. The specific viscosity $n_{sp.} = n_{rel.} - 1.n_{solv.}$. The units are deciliters/grams using a 60/40 phenol/tetrachlorothane at 25° C. The symbol n is for the Greek letter eta.

When the polyester resin is intended for use in contact with food, only those polyesters which are regulated by the Federal Food and Drug Administration should be utilized, such as set forth in Title 21, §177.1630, for example, the polyethylenephthalate polymers, and such polyesters are preferred in the present invention.

A green colored polyester resin is produced by utilizing specific color-imparting compounds to produce the green color. Specifically, a yellow colored compound is utilized with a blue colored compound to yield an intermediate green color. The resin color is measured by a Gardner Colormeter, or a Hunter Lab instrument is utilized for beverage bottle measurements. The Gardner meter utilizes reflectance (Rd) values as a measure of brightness, whereas the Hunter instrument utilizes luminance (L) as a measure of the brightness. The color hue is defined in either case by (a) or (b) values. Positive (a) coordinates (that is, an X axis) measures redness whereas Negative (a) values indicate greenness. Positive (b) (that is, positive Y coordinates) define yellowness whereas negative (b) values indicate blueness. The brightness (reflectance or luminance) of the sample is required as a point from 0 (black) to 100 (white) using both instruments. These measurements enable an approximation of the visual color used in the instrument coordinates. The measured (a) and (b) values therefore place a resin or a bottle made from the resin in one of the colored quadrants formed by their axes. In an anticlockwise direction, starting at the three o'clock position, the first quadrant is red/yellow, the second quadrant is yellow/green, the third quadrant is green/blue, and the fourth quadrant is blue/red. The color green of the present invention is in the second quadrant, that is basically a green compound with a yellow tinge thereto.

Regardless of the type (that is, chemical formulation) of polyester or the process utilized, a green color is imparted to the polyester by utilizing specific color imparting compounds. The compounds which are utilized include iron catalysts, titanium catalysts, and a blue pigment. Additionally, the polyester can contain conventional additives such as stabilizers, antioxidants, and the like.

Considering first the iron compound, it is generally an iron salt including the various hydrates thereof, which thermally decomposes during the polymerization process to produce an iron oxide, that is, alpha-$Fe_2O_3$. Alpha-$Fe_2O_3$ has a yellow color. It is to be understand that whenever the term "iron salt" is used in this specification, it includes the various hydrates thereof. The iron salt serves as a catalyst during the polycondensation step and may be added preferably during such step or may be added initially, as during the esterification step. As noted, during the polymerization, the salt is thermally decomposed to an iron oxide compound. Such iron oxide compound serves as a yellow pigment. The polymerization temperature is a temperature to cause the iron salt or catalyst compound to thermally decompose, as for example, 250° C. or greater, or preferably 270° C. or greater. The iron salt is a true catalyst in that it can often completely replace the polycondensation catalyst normally utilized. Specific examples of iron salts include ferric nitrate, that is $Fe(NO_3)_3 \cdot 9H_2O$, ferric citrate such as $FeC_6H_5O_7 \cdot 3H_2O$, ferric acetylacetonate, ferric ammonium citrate, ferrous sulfate such as $FeSO_4 \cdot 7H_2O$, ferric sulfate such as $Fe_2(SO_4)_3 \cdot 6H_2O$, ferrous chloride such as $FeCl_2 \cdot 4H_2O$, and ferric chloride such as $FeCl_3 \cdot H_2O$. Of these specific compounds, ferric nitrate is preferred. Additionally, a preformed alpha-ferric oxide which gives good dispersion can also be utilized. Based upon the weight of the final polyester resin produced, the amount of iron salt-catalyst as iron (Fe) ranges from about 50 to about 300 parts by weight per million parts, desirably from about 80 to about 150 parts, optimally is about 100 parts.

The titanium catalysts can be alkyl esters having from 3 to 10 carbon atoms, or titanium chelates having from 4 to 50 carbon atoms with from 6 to 32 carbon atoms being preferred. The titanium catalysts act as a polycondensation catalyst as well as influence the yellow shade (reddening effect) produced by the iron. Of the numerous titanates which may be utilized, the following are desirable, titanium triethanolamine, titanium acetyl acetonate, tetrabutyl titanate, tetraisopropyl titanate, and titanium glycolate. Examples of suitable titanium chelates include titanium acetyl acetonate, triethanolamine titanium chelate, lactic acid titanium chelate, tetraoctylene glycol chelate, and the like. The first two chelates are often referred to as titanium alkyl esters and thus have also been previously listed as such. A specific source of chelates are the DuPont Co. under the name "TYZOR". Of the various titanium compounds, titanium acetyl acetonate is preferred with titanium triethanolamine being highly preferred. The amount of the titanium catalysts as titanium (Ti), based upon one million parts by weight of the final amount of polyester resin produced generally ranges from about 2 parts to about 250 parts, with from about 50 to about 150 parts being desirable and approximately 100 parts by weight being preferred. The titanium catalysts can be added during the esterification or polycondensation stage.

A blue pigment is utilized so that in combination with the yellow iron oxide compound produced and the titanium catalysts, an intermediate color, green or green with a yellow tinge, is produced. That is, the green color desired for the present invention resides within the second above-noted color quadrant. Based upon the (a) and (b) coordinates, the color utilizing a one-eighth inch solid state resin cube having a density of approximately 1.4 grams per cc is as follows. Gardner values of from about minus 5 to about minus 20 and preferably from about minus 9 to about minus 15 on the (a) scale, and from about 1 to about 10 and preferably from about 2 to about 5 on the (b) scale or coordinate. The Hunter value ranges from about minus 5 to about minus 25 and preferably from about minus 10 to about minus 18 on the (a) coordinate and from about 1 to about 10 and preferably from about 2 to about 5 on the (b) coordinate. When a bottle is produced, the Hunter values range from about minus 5 to about minus 30 and preferably from about minus 14 to about minus 25 on the (a) coordinate and from about 1 to about 15 and preferably from about 5 to about 15 on the (b) coordinate. Thus, essentially a green color is produced or more exactly, a green color having a yellow tinge thereto.

The blue pigment which is utilized can be any blue pigment which produces, in combination with the other catalysts, the desired green color. Desirably, a pigment blue member 15 is desired, that is C.I. (color index number) of 74160. A specific example of the blue pigment which is preferably added during the esterification stage, but it can also be added during the polycondensation stage, is phthalocyanine blue. Phthalocyanine blue is commercially available from many suppliers such as Paliofast Blue manufactured by BASF, or as Monastral Blue, manufactured by DuPont. The amount of phthalocyanine blue utilized per million parts of the final polyester resin produced ranges from about 20 to about 100 parts by weight, with a preferred range being from about 30 to about 50 parts by weight.

The polyester resins of the present invention can be utilized in various conventional process apparatus such as calenders, injection molding machines, blow molding machines, extrusion machines, and the like, to produce any desired article which has a green color thereto. A particular area of use is a container area, such as bottles, and more particularly beverage bottles, for example soft drink bottles.

The invention will be better understood by reference to the following examples.

Green PET resins have been prepared according to the invention via batch processes (although continuous processes can also be utilized) in amounts ranging from about 50 grams to about 1,500 or 2,000 pounds. In the following examples, the iron and titanium catalyst level used are indicated by parts per million of Fe or Ti by weight of PET. The phthalocyanine blue pigment amount used is also in parts per million by weight of PET.

The appropriate amount of phthalocyanine blue is slurried in ethylene glycol and added to a low molecular weight oligomeric mixture of PET at 270°-290° C. in a manner as set forth in U.S. Pat. No. 4,020,049 to Rinehart. A portion of this esterified product mixture is transformed to another vessel where separately prepared solutions of ferric nitrate and Tyzor TE (titanium triethanolamine) in ethylene glycol are added. The pressure of the vessel is gradually reduced to less than 1 millimeter of mercury to polycondense the mixture to a green PET with the desired molecular weight (I.V.). A solid state polymerization is then carried out to yield a desired I.V. resin for conversion to carbonated beverage bottles. The amounts of the various compounds as well as the color is set forth in Table I.

TABLE I

| Composition, ppm[1] | | | Color Resin | | | | | | Bottle HUNTER | | |
|---|---|---|---|---|---|---|---|---|---|---|---|
| | | | Feed GARDNER | | | Solid State[2] GARDNER | | | | | |
| FeN | Ti TE | PB | Rd | a | b | Rd | a | b | L | a | b |
| (Terephthalate Acid) | | | | | | | | | | | |
| 150 | 20 | 75 | 8.0 | −16.0 | 9.2 | 24.7 | −14.7 | 7.0 | 77.8 | −14.8 | 8.2 |
| 100 | 100 | 40 | 2.9 | −3.2 | 2.7 | 20.0 | −10.5 | 3.7 | 72.9 | −16.7 | 11.1 |
| 100 | 100 | 45 | 3.0 | −2.9 | 2.3 | 18.7 | −10.6 | 4.4 | 73.5 | −18.1 | 12.0 |
| 120 | 100 | 40 | 3.3 | −3.1 | 2.7 | 20.1 | −9.1 | 4.2 | 75.2 | −15.6 | 12.9 |

TABLE I-continued

| Composition, ppm[1] | | | | Color Resin | | | | | | Bottle | | |
|---|---|---|---|---|---|---|---|---|---|---|---|---|
| | | | | Feed GARDNER | | | Solid State[2] GARDNER | | | HUNTER | | |
| FeN | Ti TE | PB | Rd | a | b | Rd | a | b | L | a | b |
| (Dimethylterephthalate) | | | | | | | | | | | | |
| 300 | — | 100 | 4.5 | −8.7 | 4.8 | 14.4 | −11.0 | 3.0 | 66.5 | −26.7 | 12.3 |

FeN = Fe(NO$_3$)$_3$.9H$_2$O
Ti TE = Dupont's Tyzor TE, triethanolamine titanium chelate
PB = Phthalocyanine Blue Pigment 15 Color index number 74160
[1] ppm element e.g., Fe, Ti based on the polymer
[2] intrinsic viscosity (I.V.) ≈ 0.72

As apparent from the above table, the bottle tends to have a slightly different color than the solid state resin. This is due to the fact that the bottle thickness is generally thinner than the resin and thus imparts a different color. In any event, a suitable end color can be readily achieved.

While having described the best mode as well as the preferred embodiments of the present invention, in accordance with the patent statutes, it is noted that the invention is not limited thereto, the scope of the invention being measured by the attached claims.

What is claimed is:

1. In a polyester article the improvement comprising:
   a small amount of various color-imparting compounds contained in the polyester for imparting a green color thereto,
   said compounds comprising an iron compound, a titanium catalyst, and a blue pigment, said iron compound being a preformed alpha-ferric oxide or an iron salt which is thermally decomposed during polymerization of said polyester to an alpha-ferric oxide,
   the proportion of said compounds being sufficient to effect a green color.

2. A polyester article according to claim 1, wherein said blue pigment is phthalocyanine blue, and wherein said titanium catalyst is a titanium chelate having from 4 to 50 carbon atoms or a titanium alkyl ester having from 3 to 10 carbon atoms.

3. A polyester article having a green color according to claim 2, wherein the amount of iron compound utilized is such that the amount of iron ranges from about 50 to about 300 parts by weight based upon one million parts of said polyester, wherein the amount of said titanium catalyst utilized is such that the amount of titanium ranges from about 2 parts to about 250 parts by weight based upon one million parts by weight of said polyester, and wherein the amount of said phthalocyanine blue ranges from about 20 parts to about 100 parts by weight based upon one million parts by weight of said polyester.

4. A polyester article according to claim 3, wherein said iron compound is selected from the group consisting of ferric nitrate, ferric citrate, ferric acetylacetonate, ferric ammonium citrate, ferric sulfate, ferrous sulfate, ferric chloride, ferrous chloride, preformed alpha-ferric oxide, the hydrated forms thereof, and combinations thereof, wherein said titanium catalysts added to said polyester during preparation thereof is selected from the group consisting of titanium triethanolamine, titanium acetyl acetonate, tetrabutyl titanate, tetraisopropyl titanate, titanium glycolate, lactic acid titanium chelate, tetraoctylene glycol titanium chelate, and combinations thereof.

5. A polyester article according to claim 4 wherein said iron compound is ferric nitrate nonahydrate, and wherein said titanium catalyst is titanium triethanolamine.

6. A polyester article according to claim 5, wherein the amount of said iron ranges from about 80 parts to about 150 parts, wherein the amount of said titanium ranges from about 50 to about 150 parts, and wherein the amount of said phthalocyanine blue compound ranges from about 30 to about 50 parts, and said blue pigment is pigment blue 15, color index nunber 74160.

7. A polyester article according to claims, 2, 3, 4, 5, or 6, wherein said polyester article is in the form of a bottle, and wherein said color has a Hunter (a) coordinate value of from about minus 5 to about minus 30 and a (b) coordinate value of from about 1 to about 15.

8. A polyester article according to claim 7, wherein said polyester polymer is polyethyleneterephthalate.

9. A polyester article according to claim 7, wherein said polyester is made from the reaction of dicarboxylic acid and diesters with a polyhydric alcohol, said dicarboxylic acid selected from the group consisting of alkyl dicarboxylic acids having a total of from 2 to 16 carbon atoms, aryl or alkyl substituted aryl dicarboxylic acids containing a total of from 8 to about 16 carbon atoms, and combinations thereof, said diester selected from the group consisting of an alkyl diester having from 4 to 20 carbon atoms, an alkyl substituted aryl ester having from 10 to 20 carbon atoms, and combinations thereof, and wherein said polyhydric alcohol is selected from the group consisting of glycols having from 2 to 12 carbon atoms, from glycol ethers containing from 4 to 12 carbon atoms, and combinations thereof.

10. A green colored polyester resin, comprising:
    color-imparting compounds dispersed in the polyester resin, said compounds being an iron compound, a titanium catalyst, and a blue pigment, said iron compound being a preformed alpha-ferric oxide or an iron salt which is thermally decomposed during polymerization of said resin to alpha-ferric oxide,
    the amount of said pigments being such so that a green color is imparted to said polyester resin.

11. A green colored polyester resin according to claim 10, wherein said titanium catalyst is a titanium alkyl ester having from 3 to 10 carbon atoms or a titanium chelate compound having from 4 to 50 carbon atoms, and wherein said blue pigment is phthalocyanine blue.

12. A green colored polyester resin according to claim 11, wherein the amount of iron in said iron compound ranges from about 50 to about 300 parts per million parts of said polyester resin, wherein the amount of titanium in said titanium catalyst ranges from about 2 parts to about 250 parts per one million parts by weight of said polyester resin, and wherein the amount of said phthalocyanine blue pigment ranges from about 20 parts to about 100 parts by weight based upon one million parts by weight of said polyester resin.

13. A green colored polyester resin according to claim 12, wherein said iron salt is selected from the group consisting of ferric nitrate, ferric citrate, ferric acetylacetonate, ferric ammonium citrate, ferric sulfate, ferrous sulfate, ferric chloride, ferrous chloride, preformed alpha-ferric oxide, the hydrated forms thereof, and combinations thereof, wherein said titanium catalyst is selected from the group consisting of titanium triethanolamine, titanium acetyl acetonate, tetrabutyl titanate, tetraisopropyl titanate, titanium glycolate, lactic acid titanium chelate, tetraoctylene glycol titanium chelate, and combinations thereof.

14. A green colored polyester resin according to claim 13, wherein the intrinsic viscosity of said resin ranges from about 0.60 to about 1.0.

15. A green colored polyester resin according to claim 14, wherein said iron compound is ferric nitrate nonahydrate, and wherein said titanium catalyst is titanium triethanolamine.

16. A green colored polyester resin according to claims 11, 12, 13, 14, or 15, wherein the amount of iron ranges from about 80 parts to about 150 parts, wherein the amount of said titanium ranges from about 50 parts to about 150 parts, and wherein the amount of said phthalocyanine blue compound ranges from about 30 parts to about 50 parts, wherein said blue pigment is pigment blue 15, color index number 74160, and wherein said intrinsic viscosity ranges from about 0.70 to about 0.85.

17. A green colored polyester resin according to claims 11, 13, 14, or 15, wherein said polyester is made from the reaction of dicarboxylic acid and diesters, with polyhydric alcohol, said dicarboxylic acid selected from the group consisting of alkyl dicarboxylic acids having a total of from 2 to 16 carbon atoms, aryl or alkyl substituted aryl dicarboxylic acids containing a total of 8 to 16 carbon atoms, and combinations thereof, said diester selected from the group consisting of an alkyl diester having from 4 to 20 carbon atoms, an alkyl substituted aryl ester having from 10 to 20 carbon atoms, and combinations thereof, and wherein said polyhydric alcohol is selected from the group consisting of glycols having from 2 to 12 carbon atoms, from glycol ethers containing from 4 to 12 carbon atoms, and combinations thereof.

18. A green colored polyester resin according to claim 17, wherein said polyester resin is polyethyleneterephthalate.

19. A green colored polyester resin according to claim 18, wherein said green color has a Gardner (a) coordinate of from about minus 5 to about minus 20 and a (b) coordinate of from about 1 to about 10.

20. A process for making a polyester resin having a green color, comprising the steps of:
preparing a polyester resin,
adding an iron compound to said polyester resin during preparation thereof,
adding a titanium catalyst to said polyester resin during preparation thereof,
adding a blue pigment to said polyester resin during preparation thereof, and
imparting a green color to said resin by utilizing sufficient amounts of said iron compound, said titanium catalyst, and said blue pigment.

21. A process according to claim 20, wherein said iron compound is a preformed alpha-ferric oxide or a thermally decomposable iron salt, thermally decomposing said iron salt to yield an alpha-ferric oxide during said preparation of said polyester resin, wherein said titanium catalyst is a titanium chelate having from 4 to 50 carbon atoms or a titanium alkyl ester having from 3 to 10 carbon atoms, and wherein said blue pigment is phthalocyanine blue.

22. A process according to claim 21, wherein, based upon one million parts of said polyester resin, the amount of iron contained in said iron compound is from about 50 to about 300 parts by weight, wherein the amount of titanium contained in said titanium catalyst is from about 2 to about 250 parts by weight, and wherein the amount of said phthalocyanine blue is from about 20 to about 100 parts by weight.

23. A process according to claim 21, wherein said iron salt added to said polyester article during preparation thereof is selected from the group consisting of ferric nitrate, ferric citrate, ferric acetylacetonate, ferric ammonium citrate, ferric sulfate, ferrous sulfate, ferric chloride, ferrous chloride, preformed ferric oxide, the hydrated forms thereof, and combinations thereof, wherein said titanium catalysts added to said polyester during preparation thereof are selected from the group consisting of titanium triethanolamine chelate, titanium acetyl acetonate, tetrabutyl titanate, tetraisopropyl titanate, titanium glycolate, lactic acid titanium chelate, tetraoctylene glycol titanium chelate, and combinations thereof.

24. A process according to claim 23, including polymerizing said polyester resin during preparation thereof so that the intrinsic viscosity ranges from about 0.60 to about 1.0.

25. A process according to claim 24, wherein said iron salt is ferric nitrate nonahydrate, wherein said titanium catalysts are titanium triethanolamine, and wherein said intrinsic viscosity of said resin ranges from about 0.70 to about 0.85.

26. A process according to claim 25, wherein the amount of said iron ranges from about 80 to about 150 parts, wherein the amount of said titanium ranges from about 50 to about 150 parts, and wherein the amount of said phthalocyanine blue compound ranges from about 30 to about 50 parts.

27. A process according to claims 21, 23, 24, 25, or 26, including making said polyester resin into a bottle.

28. A process according to claims 21, 23, 24, 25, or 26, wherein said polyester resin is polyethyleneterephthalate.

29. A process according to claim 21, 23, 25, or 26, including adding said iron compound and said titanium catalysts during the polycondensation stage of preparation and including adding said phthalocyanine blue compound during the esterification stage of preparation.

30. A process according to claims 21, 23, 24, 25, or 26, including making said polyester resin by reacting a dicarboxylic acid or a diester with a polyhydric alcohol, said dicarboxylic acid selected from the group consisting of alkyl dicarboxylic acids having a total of from 2 to 16 carbon atoms, aryl or alkyl substituted aryl dicarboxylic acids containing a total of from 8 to about 16 carbon atoms, and combinations thereof, said diester selected from the group consisting of an alkyl diester having from 4 to 20 carbon atoms, an alkyl substituted aryl ester having from 10 to 20 carbon atoms, and combinations thereof, and wherein said polyhydric alcohol is selected from the group consisting of glycols having from 2 to 12 carbon atoms, from glycol ethers containing from 4 to 12 carbon atoms, and combinations thereof.

* * * * *